United States Patent
Chen et al.

(10) Patent No.: US 7,558,176 B2
(45) Date of Patent: Jul. 7, 2009

(54) METHOD FOR PREVENTING OPTICAL DISK FROM BEING SCRAPED

(75) Inventors: Song-Ruei Chen, Hsin-Chu (TW);
Chih-Chang Cheu, Hsin-Chu (TW);
Rong-Son Jeng, Hsin-Chu (TW);
Chun-Cheng Chang, Hsin-Chu (TW);
Chung-Ming Chen, Hsin-Chu (TW)

(73) Assignee: Lite-On It Corporation, Taipei (TW)

( * ) Notice: Subject to any disclaimer, the term of this patent is extended or adjusted under 35 U.S.C. 154(b) by 607 days.

(21) Appl. No.: 11/248,577

(22) Filed: Oct. 13, 2005

(65) Prior Publication Data
US 2006/0083142 A1    Apr. 20, 2006

(30) Foreign Application Priority Data
Oct. 14, 2004    (TW) .............................. 93131190 A

(51) Int. Cl.
*G11B 7/00*    (2006.01)
(52) U.S. Cl. .................... 369/53.28; 369/44.27
(58) Field of Classification Search .................. None
See application file for complete search history.

(56) References Cited

U.S. PATENT DOCUMENTS 6,314,064 B1 * 11/2001 Ueda et al. ............... 369/44.23
6,608,802 B1 * 8/2003 Maeda et al. ............. 369/44.15
6,678,233 B2 * 1/2004 Chung et al. ........... 369/112.08
7,233,562 B2 * 6/2007 Itonaga ................... 369/112.01
7,345,266 B2 * 3/2008 Lin et al. .................. 250/201.5

FOREIGN PATENT DOCUMENTS

JP    57133527 A    *    8/1982

OTHER PUBLICATIONS

English Translation of Yoshida et al., JP 57133527 A, Aug. 1982.*

* cited by examiner

*Primary Examiner*—Peter Vincent Agustin
(74) *Attorney, Agent, or Firm*—Stout, Uxa, Buyan & Mullins, LLP

(57) ABSTRACT

The method prevents an optical disk from being scraped by an optical apparatus of a pickup head of an optical disc drive is disclosed, it mainly includes: moving the optical apparatus of the pickup head to a detection position in which the laser-light emitted from the pickup head focuses on the optical disk; detecting the first-detection position and setting a movement boundary according to the first-detection position, wherein the movement boundary has a upper boundary and a bottom boundary; preventing the optical apparatus from moving out of the movement boundary. The present method can be implemented without installing any additional apparatus in the original video disc player, and can prevent the optical disk and the inner apparatus of the optical disc drive from being scraped or damaged by the pickup head during a read/write process to increase the service life of the optical disk and the optical disc drive.

14 Claims, 4 Drawing Sheets

METHOD FOR PREVENTING OPTICAL DISK FROM BEING SCRAPED

BACKGROUND OF THE INVENTION

1. Field of the Invention

The present invention relates to a method for preventing optical disks from being scraped, and more particularly to a method for preventing optical disks from being scraped by a pickup head of an optical disc drive.

2. Description of the Prior Art

As the technology of digital multimedia has been rapidly improved over the last twenty years, it became fast and easy to handle a large number of data or information. For example, a great deal of data can be effectively and promptly written/read or stored/restored via optical recording media, such as an optical disk, through optical operating technology. The optical recording media has many advantages, such as small volume, portable property, easy restoration, and large data capacity, etc. Since the compact disk (CD) had been developed in the early time, many other types of CDs which have different functions have been developed in succession, for example CD-ROM, CD-RW, VCD and even the DVD (digital versatile disk) has a larger data capacity with better multimedia functions. An optical disc drive is a data read/write device which is integrated with optical, mechanical and electric operations, and through the operation of the pickup head of the optical disc drive, data can be read from or written in the optical disk.

FIG. 1 shows a basic structure and read/write operation of an optical disc drive. First, a beam of laser light is emitted from a laser diode 102 of a pickup head 100 in the optical disc drive. Following, the beam of laser light passes through a PBS 104, a collimator 106 and an object lens device 110 of the pickup head 100, then it focuses exactly on the concave 1182 of a data track of an optical disk 118 which is revolving at 200~530 rev/min. The laser light is then interfered due to the coherency and optical property of the concave 1182 of the data track, and reflected by the read/write surface of the optical disk 118. Sequentially, the reflected laser light passes through the object lens device 110, the collimator 106 and the PBS 104 again and then it illuminates on a photodetector 116 through a cylindrical lens 114. Following, by a photo-electrical transforming mechanism of the photodetector 116, the optical signal which comes from the laser light is transformed into an electric signal (or electric current) to a micro processor (not shown) for detecting the information of the optical disk 118. The magnitude of the electric current from the photodetector 116 depends on whether the laser light from the object lens device 110 is focused on a concave, such as the concave 1182. The electric current will be smaller when the laser light is focused on a concave than when the laser light isn't focused on one. Accordingly, the information of the optical disk can be acquired via detecting variation of the magnitude of the electric current.

Accordingly aforementioned descriptions, the main operation of the pickup head 100 is using the focused laser light to scan the data track of the optical disk 118 and then sending the reflected laser light to a micro processor to detect the information of the optical disk 118 through the photodetector 116. Hence, its is necessary for the pickup head 100 to have precise focusing and tracking capabilities to get a good read/write performance. The focusing motion of the pickup head 100 is executed by controlling a voice coil motor 112 to drive the object lens device 110 upward or downward in a vertical direction to carry out the focusing servo operation; and the tracking motion is executed by way of controlling a sled motor (not shown) to drive the pickup head 100 along a horizontal surface parallel with the optical disk 118 to carry out the tracking servo operation, thus allowing the focal point of the focused laser light to exactly focus on the data track. Generally, when the pickup head 100 is conducting a read/write operation, the optical disc drive will take a focusing and tracking error signal to compensate the axial and radial wobble (or vibration) caused by the revolving optical disk 118 to make the focusing and tracking servo more precise.

The control gains of the focusing and tracking servo will be regulated in a self-adjusting process at the beginning when the optical disc drive is started. However, after the self-adjusting process is accomplished, the control gains will not be adjusted any more. Therefore, after the optical disc drive starts to conduct a read/write operation, if a exceptional reflection condition of the laser light has occurred; or there are opaque smears or dust on the read/write surface of the optical disk 118; and or the inner mechanism of the optical disc drive has experienced operation troubles, the optical signal (the laser light) reflected from the optical disk 118 will be faint and indistinct, thereby that makes the micro processor receive a faint electrical signal from the photodetector 116 and prevent a clear detection of the information of the optical disk 118 via the electric signal. At this time, the micro processor will consider the focusing servo has failed, i.e. the laser light didn't focus on the optical disk 118, and then it publishes a control signal to the pickup head 100 to move the object lens device 110 upward and downward to proceed focusing motion again.

However, no matter how the object lens device 110 moves, the photodetector 116 and micro processor can not receive a clear signal all the time, since the opaque smear or dust on the optical disk 118 or the operation troubles of the inner mechanism still exist. Hence, the optical disc drive loses its detecting basis for proceeding the focusing servo and the movement of the object lens device 110 can not stop, and then continues the focusing motion. At this time, the object lens device 110 may most probably scrap or damage the optical disk 118 in a upward focusing motion and crash the inner mechanism of the optical disc drive in a downward focusing motion, and that makes the optical disk 118 or the optical disc drive to malfunction, even more, it causes the inner circuit of the optical disc drive to burn out.

Due to the above-mentions, it needs to provide a method and apparatus for preventing the optical disk and the inner mechanism of the optical disc drive from being scraped and crashed by the object lens device of the pickup head during a read/write operation to increase the service life of the optical disk as well as the optical disc drive.

SUMMARY OF THE INVENTION

It is one of objectives of the present invention to provide a method for preventing an optical disk from being scraped to improve the disadvantages of a traditional video disc player that the optical disk and also the inner mechanism of the optical disc drive may be scraped or crashed by an object lens device in a read/write operation.

It is another one of objectives of the present invention to provide a method for preventing an optical disk from being scraped. The method can be easily implemented with software/firmware and can prevent the optical disk and the inner mechanism of an optical disc drive from being scraped and crashed when the pickup head malfunctions or an exceptional reflection condition of the optical disk has occurred.

It is another one of objectives of the present invention to provide a method for preventing the optical disk from being scraped. The method can establish a self-tuning control system according to each different optical disk, thereby a safe distance between the optical disk and the object lens device is set to avoid the object lens device from crashing the optical disk to increase service life.

It is yet another one of the objectives of the present invention to provide a method for preventing an optical disk from being scraped. The present method can be implemented without installing any additional apparatus in the original video disc player and can effectively prevent the optical disk from being scraped.

According to the above-mentioned objectives, the present invention provides a method for preventing optical disk from being scraped. The method includes: moving an object lens device of a pickup head to a detection position in which the laser-light emitted from the pickup head focuses on the read/write surface of the optical disk; detecting the detection position and setting a movement boundary according to the detection position, wherein the movement boundary has an upper boundary and an bottom boundary; and then stopping the motion of the object lens device immediately when the object lens device moves out the set movement boundary. The method can be started to proceed with a self-adjusting process which is proceeded at the startup time of the optical disc drive and achieve a purpose of an anti-scraping function for an optical disk through a focusing servo operation in the optical disc drive. Comparing the efficacy of the present method with the one of prior art, the present method has the following advantages: it can always prevent the optical disk as well as the inner mechanism of the optical disc drive from being scraped or crashed by the object lens device in a read/write operation thus avoiding the focusing motion from becoming out of control and the electric circuit being burn out, despite the pickup head could become inoperable or an exceptional reflection condition of the optical disk may occur at some time. Therefore, the service life of the optical disk and the stability of the video disk player can be promoted. Moreover, the present method can be implemented without installing any additional apparatus in the original video disc player.

The above-mentioned contents of the present invention and the following descriptions of the preferred embodiments are only for example, not intended to limit the scope of the invention. Thus, many equal variations and modifications of the following embodiments could be made without departing form the spirit of the present invention should be covered by the following claims.

BRIEF DESCRIPTION OF THE DRAWINGS

The objectives, features of the present invention as well as the advantages thereof can be best understood through the following preferred embodiments and the accompanying drawings, wherein.

DESCRIPTION OF THE PREFERRED EMBODIMENT

The invention will be explained in detail in accordance with the accompanying drawings. It is necessary to illustrate that the drawings below could be in simplified forms and not drawn in proportion to the real cases. Further, the dimensions of the drawings are enlarged for explaining and understanding more clearly.

In the invention, a method for preventing an optical disk from being scraped is disclosed, the present method mainly includes: moving an object lens device of a pickup head to a detection position in which the laser light emitted from the pickup head focuses on the optical disk; detecting the detection position and setting a movement boundary according to the detection position, wherein the movement boundary has an upper boundary and a bottom boundary; and stopping the motion of the object lens device immediately when the object lens device moves out the set movement boundary.

Figure 1:
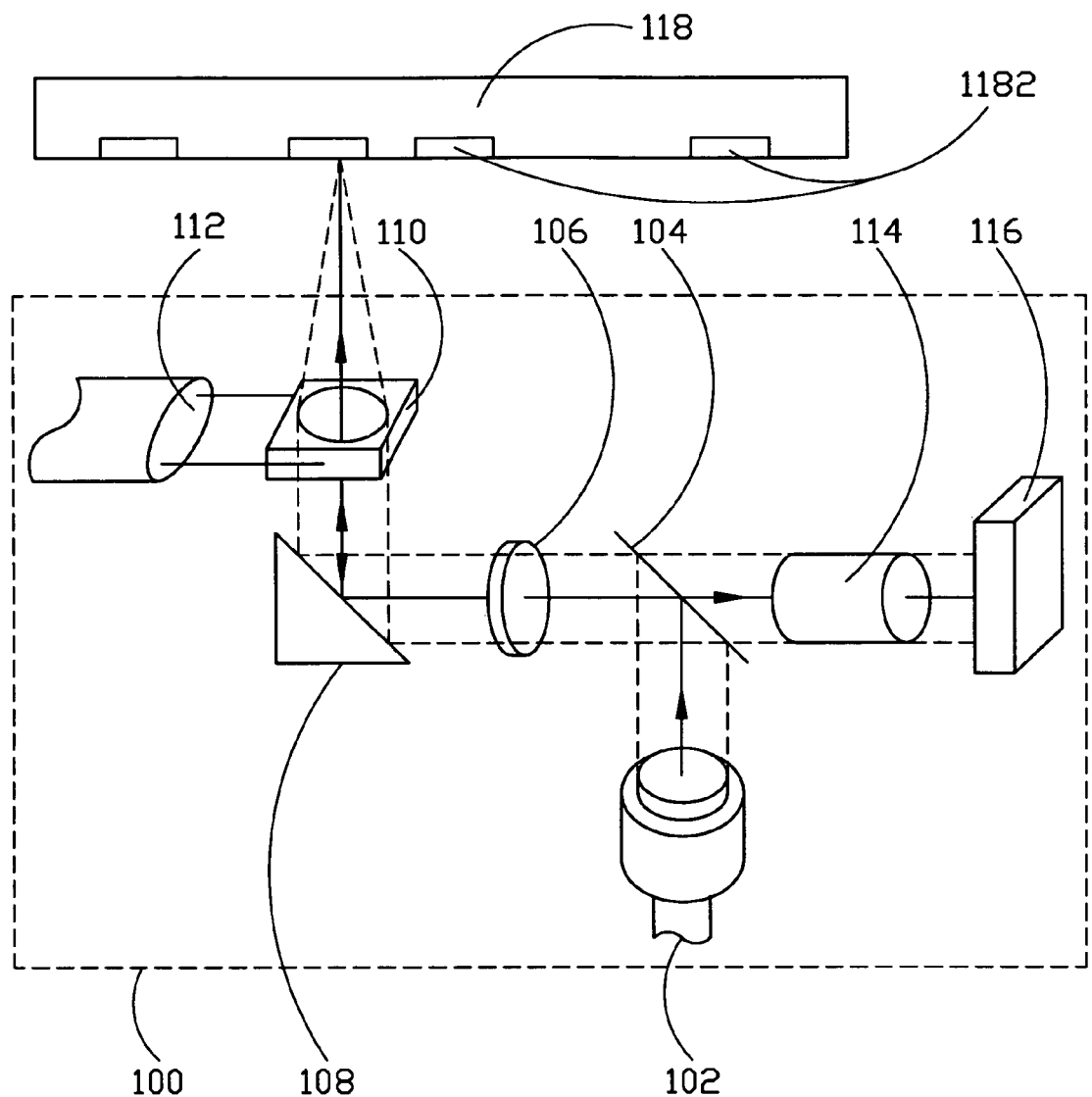
FIG. 1 is a schematic drawing showing a basic structure and read/write operation of an optical disc drive.

Referring to FIG. 1, one preferred embodiment of the method for preventing optical disk from being scraped according to the invention is described in detail in the below. The present method includes: First, moving an object lens device 110 of a pickup head 100 from an initial position and making it move step by step upward in a vertical direction which is perpendicular to the optical disk, wherein the initial position is a location where the object lens device 110 is at when the optical disk 118 has been placed into the optical disc drive and the optical disc player is initiated for use. Sequentially, stopping the continuous motion of the object lens device 110 when the object lens device 10 arrives at a focal position, wherein the focal position is a location where the object lens device 110 is at when a beam of laser light emitted from the object lens device 110 focuses on the read/write surface of the optical disk 118. Following, setting a vertical movement boundary in a vertical direction for the object lens device 110 according to the focal position, wherein the vertical direction is perpendicular to the read/write surface of the optical disk 118. Then, recovering the motion of the object lens device 110 and detecting the vertical moving condition of the object lens device 110 at all times; and then stopping the continuous motion of the object lens device 110 immediately when the object lens device 110 moves out of the set vertical movement boundary, thereby, preventing the optical disk 118 and the inner mechanism of the optical disc drive from being scraped and damaged.

Figure 2A:
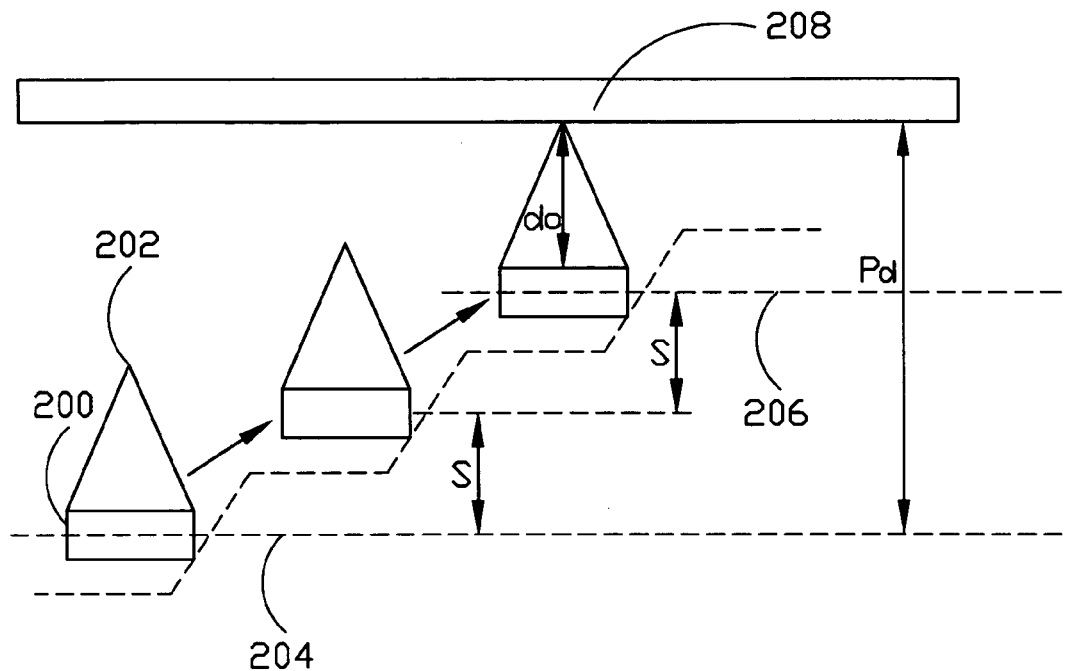
FIG. 2A is a schematic drawing showing a focusing motion manner of an object lens device according to the present invention.
Figure 2B:
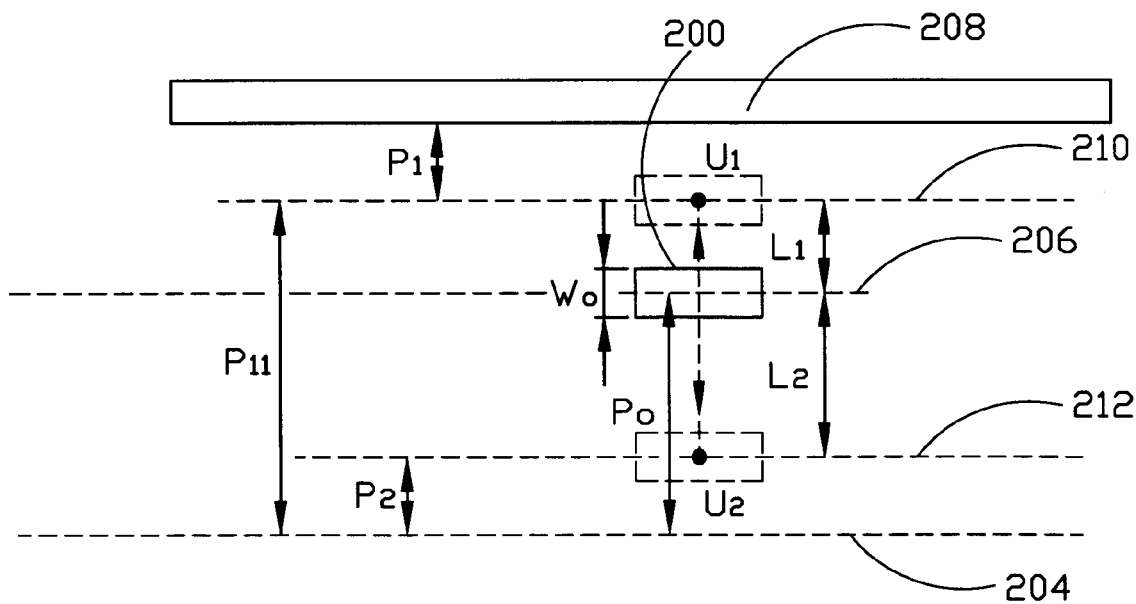
FIG. 2B is a schematic drawing of a vertical movement boundary for the object lens device according to the present invention.

Referring to FIG. 2A, the above-mentioned method of making the object lens device 118 move step by step upward is letting the object lens device 118 gradually move a short distance $S_p$ every time from the initial position 204 toward the optical disk 208, wherein the distance $S_p$ is usually very small. The operation of moving the object lens device 200 could be implemented through controlling a voice coil motor (as shown in FIG. 1) of the pickup head by feeding it a little control current to drive the object lens device 200 upward and downward. The distance $S_p$ could be decided according to the resolution of the movement of the voice motor and the vertical distance $P_d$ between the initial position 204 and the optical disk 208. As shown in FIG. 2, the vertical movement boundary has an upper boundary 210 and a bottom boundary 212, wherein the method of setting the upper boundary 210 and the bottom boundary 212 includes: taking the focal position 206 of the object lens device 200 for a detection basis, and in the vertical direction, shifting a first distance $L_1$ from the focal position 206 upward to arrive at an upper bound point $U_1$ and shifting a second distance $L_2$ downward to arrive at a bottom bound point $U_2$. Then, a horizontal plane parallel with the optical disk 118 comprising the upper bound point $U_1$ is just the so-called upper boundary 210; and a horizontal plane parallel with the optical disk 118 comprising the lower bound point $U_2$ is just the so-called bottom boundary 212. Referring to FIG. 2B again, the vertical distance between the read/write surface of the optical disk 208 and the upper boundary 210 is $P_1$, and the vertical distances which are respectively from the upper boundary 210 and the bottom boundary 212 to a horizontal plane parallel with the optical disk 118 comprising the initial position 204 are $P_{11}$ and $P_2$.

As the above-mentions, distances $P_1$ and $P_2$ could be directly effected with the distance $L_1$ and $L_2$, wherein distance $P_1$ is the safe distance between the object lens device 200 and the optical disk 208, and the distance $P_2$ is the safe distance between the object lens device 200 and the inner mechanism of the optical disc drive. By the distances $P_1$ and $P_2$, the object lens device 200 will not contact the optical disk 208 during the upward motion and destroy the inner mechanism during the downward motion. However, both distances $P_1$ and $P_2$ at least must be larger than half of the vertical width of the body of the object lens device 200 $W_0$, thereby the object lens device 200 will not crash the optical disk or the inner mechanism when it exactly arrives at the upper boundary 210 or at the bottom boundary 212. Additionally, when setting the distance $L_1$ and $L_2$, the deformation and vertical wobble (or deflection) of the optical disk 208 revolving in a high rotational speed also should be considered. For example, distance $P_1$ must be larger than the sum of the deformation of the optical disk and half of the distance from $W_0$ or the sum of the vertical wobble (or deflection) of the optical disk and half of the distance from $W_0$. Moreover, distance $L_1$ and $L_2$ could be set according to a multiple of the focal length $d_0$ of the laser light. For instance, in this embodiment, $L_1$ is set to equal to $L_2$, and both $L_1$ and $L_2$ are respectively equal to half the distance of $d_0$. However, other multiples of the focal length $d_0$ also could be considered. In one embodiment, $L_1$ and $L_2$ could be set via using a rule of thumb or a trial and error method to get the optimal values. It should be noticed, in this embodiment, the focal length $d_0$ is in fact equal to the vertical distance between the terminal face of the object lens device 200 and the read/write surface of the optical disk 208.

As above mentioned, the present method provides a set movement range of the object lens device 200 to make it move only in a vertical movement range which is between the upper boundary 210 and the bottom boundary 212, and stopping the motion of the object lens device 200 immediately when it moves out the upper boundary 210 or out the bottom boundary 212. The present method can start to proceed after an optical disk has been placed into the optical disc drive and the self-adjusting process has been started. In this embodiment, the present method starts to proceed with the self-adjusting process. Since the safe distance between the optical disk and the read/write surface of the object lens device would be effected by the thickness of each optical disk and the conditions of the inner mechanism of the optical disc drive, the present method establishes a self-tuning control system that sets a vertical movement boundary according to each optical disk to confirm that the optical disk always keeps a safe distance with the object lens device. In other words, the vertical movement boundary would be set case by case for each optical disk.

Figure 3:
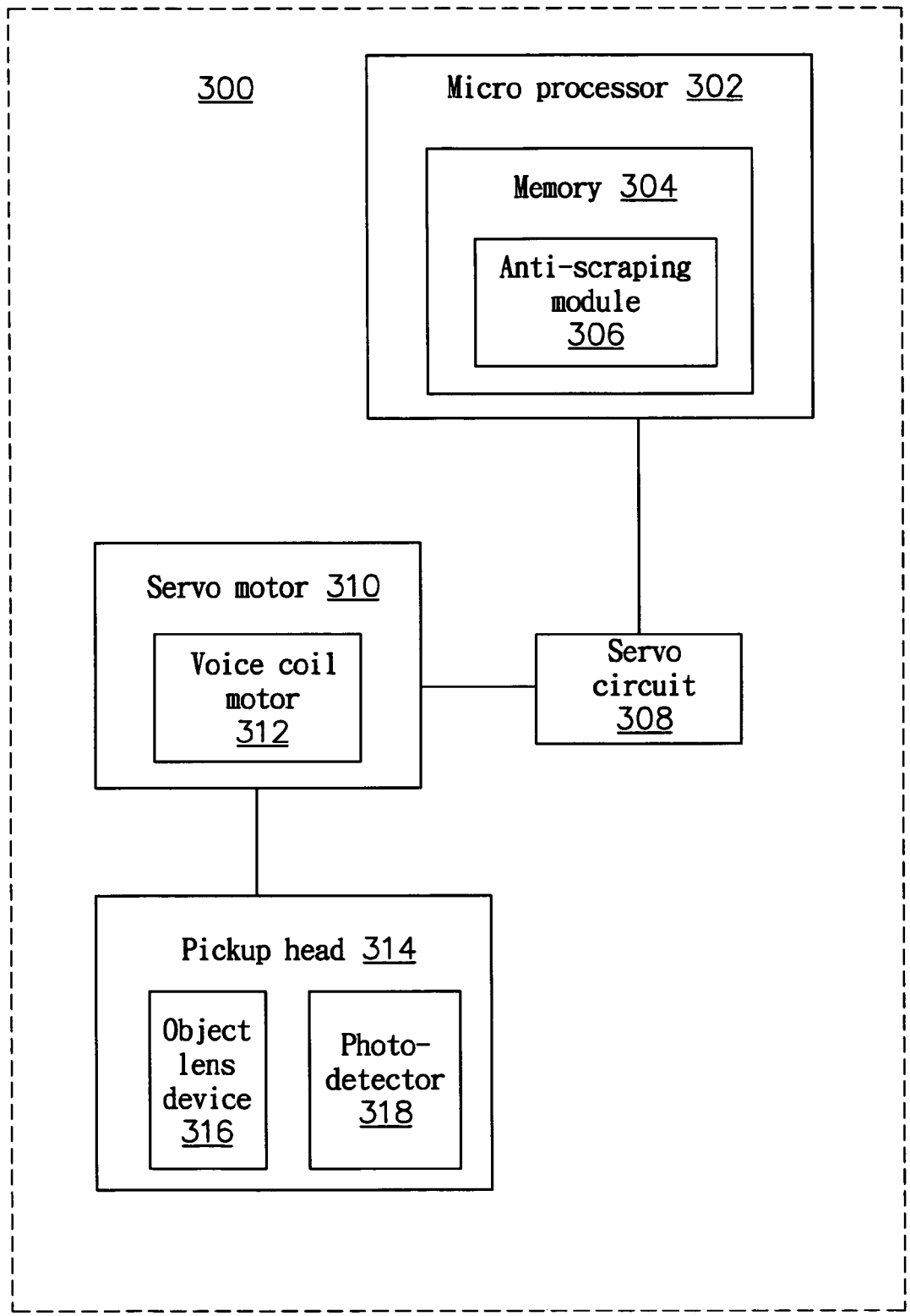
FIG. 3 is a schematic drawing of an optical disc drive device with an anti-scraping function according to the present invention.

FIG. 3 shows a schematic drawing of an optical disc drive 300 with an anti-scraping module according to a preferred embodiment of the present invention, wherein the anti-scraping module has an anti-scraping function for preventing an optical disk from being scarped. The optical disc drive 300 at least includes: a micro processor 302, a memory 304, an anti-scraping module 306, a servo circuit 308, a servo motor 310, a pickup head 314 and a photodetector 318, wherein the pickup head 314 comprises an object lens device 316. The memory 304 is used to store all the needed instructions, parameters, and programs for operating the optical disc drive 300 and the memory 304 is implemented in the micro processor 302. The micro processor 302 not only can receive and respond to the signals that come from outside the optical disc drive 300 but also execute the related instructions, parameters, and programs stored in the memory 304. The anti-scraping module 306 is implemented in the memory 304 by program codes and it is used to provide the micro processor 302 with a certain program or instructions, thereby the micro processor 302 executes an anti-scarping operation process to keep the object lens device 316 of the pickup head 314 within a vertical movement boundary during a read/write operation.

Additionally, the anti-scraping module 306 can be combined with a self-adjusting process module. Therefore, when an optical disk has been placed into the optical disc drive 300 and the self-adjusting process is started by the micro processor 302, the anti-scraping operation process is started at the same time. The photodetector 318 is used to detect whether the beam of laser light emitted from the object lens device 316 is focused on the read/write surface of the optical disk. The servo motor 310 includes a spindle motor, a voice coil motor and a sled motor, wherein the spindle motor is used to drive the optical disk to revolve, the voice coil motor is used to drive the object lens device 316 to move in the vertical direction, and the sled motor is used to drive the pickup head to move along a horizontal plane. According to the instructions provided by the anti-scraping module, the micro processor 302 could control the servo motor to make the pickup head 314 proceed the anti-scraping operation process through the servo circuit 308. Therefore, the pickup head 314 will smoothly proceed a read/write operation without the problem of scraping or crashing.

Figure 4:
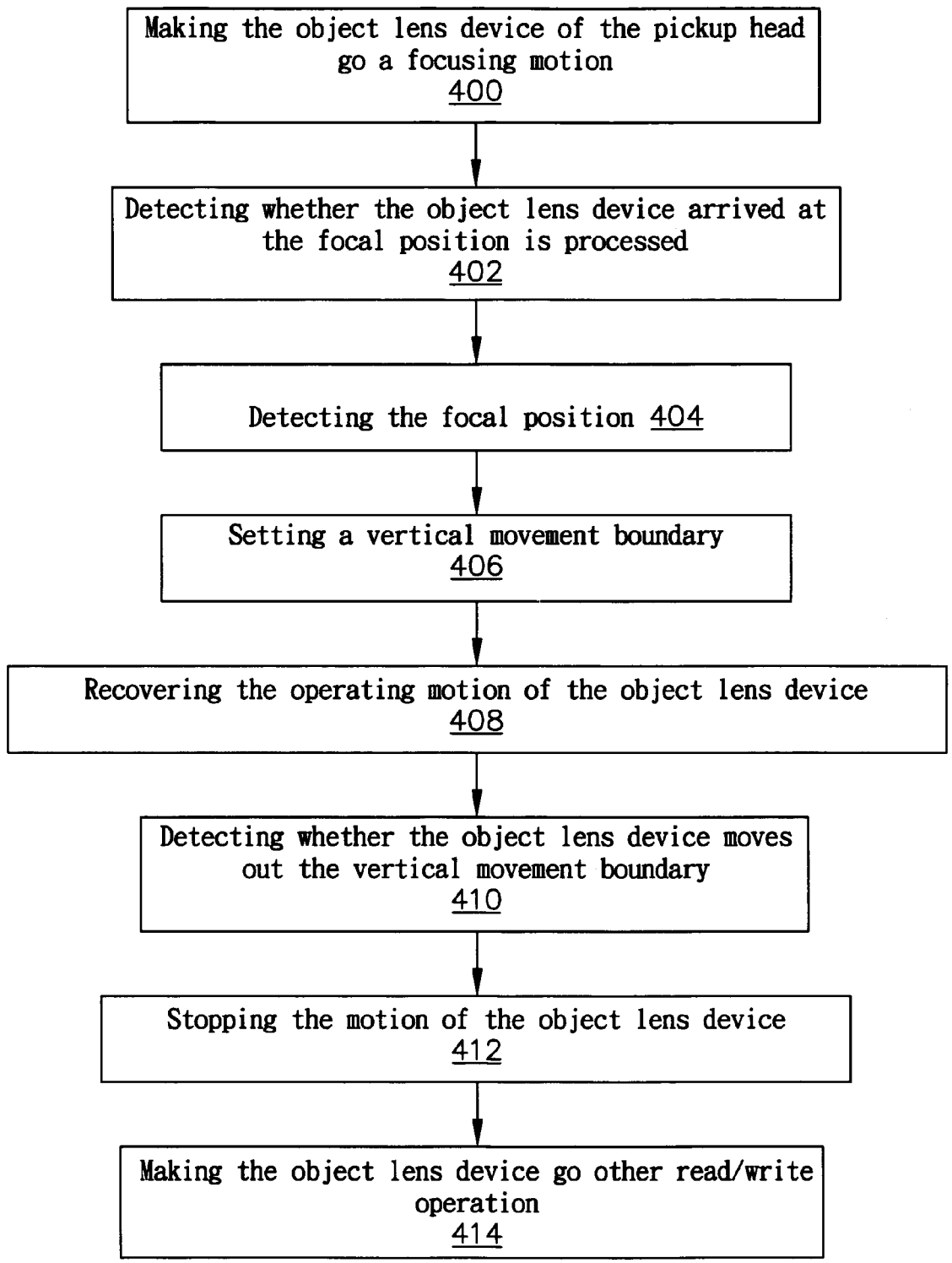
FIG. 4 is a flow chart of the operational processes of a method for preventing the optical disk from being scraped according to the present invention.

Referring to FIG. 4, it shows a flow chart of the operational process of the method for preventing an optical disk from being scraped according to the present invention. The operation process includes: first, the process 400 which makes the object lens device of the pickup head perform a focusing motion after the optical disk is placed into the optical disc drive. In the process 400, the focusing motion mentioned above is executed by the micro processor sending a control signal to the servo circuit to drive the voice coil motor and then the object lens device is driven by the voice coil motor to move step by step towards the optical disk from its initial position. At this time, the reflected laser light, which is reflected from the optical disk, continuously passes through the PBS, the collimator and then illuminates on the photodetector. Following, the process 402 of detecting whether the object lens device arrived at the focal position is processed. In the process 402, the micro processor detects whether the laser light focused on the optical disk read/write surface according to the electric signal outputted form the photodetector; if the laser light focuses on the optical disk, i.e. the object lens device is at the focal position, the micro processor will control the voice coil motor via the servo circuit to stop moving the object lens device.

Following the process 404 for detecting the focal position is processed. In the process 404, the micro processor detects the vertical distance $P_0$ (as shown in FIG. 2) between the focal position and the horizontal plane comprising the initial position, according to a control voltage $V_0$ published by the micro processor which makes the object lens device move from the initial position to the focal position. It should be specially known that the control voltage $V_0$ used to control the voice coil motor is generally in proportion to the vertical distance which the object lens device moves, thus, the position where the object lens device is can be detected according to the control voltages published by the micro processor.

Sequentially, the process 406 of setting a vertical movement boundary is proceeded. In the process 406, a vertical movement boundary is set based on the focal position, wherein the range of the vertical movement boundary can be set according to the focal length of the object lens device or through considering other detection basis. The focal length as well as the other detection basis can be set in the anti-scraping module in advance, therefore, a vertical movement boundary corresponding to the focal position will immediately be asserted as the focal position is detected. As shown in FIG. 2B, the vertical distances which are respectively from the upper boundary and the bottom boundary to the horizontal plane parallel with the optical disk 118 comprising the initial position are marked as $P_1$ and $P_2$. According to the ratio relation among the $P_1$, $P_2$, $P_{11}$ and $V_0$, the control voltage $V_1$ used to make the object lens move from the focal position to the upper boundary and the control voltage $V_2$ used to make the object lens move from the focal position to the bottom boundary in the vertical direction could be acquired. Following, the micro processor transforms the vertical movement boundary into a corresponding control voltage boundary which has an upper bound voltage $V_1$ and a bottom bound voltage $V_2$ and then stores the control voltage boundary in the memory. Sequentially, the process 408 of recovering the operating motion of the object lens device is proceeded. After the vertical movement boundary has been asserted, the object lens device will start to proceed a read/write operation.

Following, the process 410 of detecting whether the object lens device moves out the vertical movement boundary is proceeded. In the process 410, micro processor detects the position of the object lens device all the time, and when the object lens device moves out the vertical movement boundary, i.e. the control voltage from the micro processor is higher than $V_1$ or lower than $V_2$, the process 412 which is stopping the motion of the object lens device is proceeded. Following, the process 414 for making the object lens device perform other read/write operations is proceeded. In the process 414, the object lens device is driven again in other ways to allow the pickup head to smoothly carry on other read/write operations.

By the above-mentioned anti-scraping operation processes, the optical disk will not be scraped by the object lens device during the upward motion and also the inner mechanism of the optical disc drive will not be damaged by the object lens device during the downward motion any more. The special conditions which makes the object lens device move from the vertical movement boundary usually refers to a exceptional reflecting condition of the laser light has occurred; or there are a number of opaque smears on the read/write surface of the optical disk 118; or the inner mechanism of the optical disc drive has got some operational troubles, and all that makes the optical signal (the laser light) reflected from the optical disk be too faint or indistinct to detect, thereby, preventing the micro processor from receiving the electric signal from the photodetector and clearly detecting the information of the optical disk via the electric signal.

Thus, in these special conditions, the micro processor considers the focal servo as failing, i.e. the laser light doesn't focus on the optical disk, and then it sends a control signal to drive the object lens device upward and downward to proceed a focusing motion again until a clear electric signal is received. So, without the present anti-scraping operation process, the object lens device may most probably scrape the optical disk in a upward focusing motion or destroy the inner mechanism in a downward focusing motion, and all this damages the optical disk or the optical disc drive, even more, causing a portion of the optical disc drive circuit to burn out.

Form the all contents described above, it can be known that the method for preventing optical disk from being scraped of the present invention can be implemented without altering the mechanism of the original video disc player or installing any additional apparatus' in the original video disc player. Instead of the installing hardware, the present invention is implemented by software/firmware which installs an anti-scraping module in a micro processor, thereby the micro processor will detect the focal position of the object lens device and set a vertical movement boundary according to the optical disk which is now placed in the optical disc drive before the pickup head proceeds a read/write operation. Sequentially, the micro processor detects whether the object lens device moves out of the vertical movement boundary and stops the motion of the object lens device immediately when the object lens device moves out the vertical movement boundary.

The above-mentioned preferred embodiments of the present invention are just for example, not limits. Thus, many variations and modifications of the embodiments made without departing form the spirit of the present invention should be covered by the following claims.

What is claimed is:

1. A method for preventing an optical disk from being scraped, comprising:

moving a pickup head of an optical read/write device to a focal position in which laser light emitted from said optical read/write device is focused on a read/write surface of an optical disk; and setting a vertical movement boundary in a vertical direction for said optical read/write device according to said focal position;

wherein said vertical movement boundary has an upper boundary and a bottom boundary, said vertical direction is perpendicular to said read/write surface of said optical disk, and the process of said setting said vertical movement boundary comprises:

taking said focal position as a detection basis;

shifting a first distance $L_1$ from said focal position upward to an upper bound point in said vertical direction; and shifting a second distance $L_2$ from said focal position downward to a bottom bound point in said vertical direction; and wherein a first horizontal plane parallel with said optical disk comprising said upper bound point is said upper boundary and a second horizontal plane parallel with said optical disk comprising said bottom bound point is said bottom boundary.

2. The method according to claim 1, further comprising stopping the motion of said optical read/write device immediately when said optical read/write device is moving out of said movement boundary.

3. The method according to claim 2, further comprising driving said optical read/write device to make said pickup head continue getting information of said optical disk, after the process of said stopping the motion of said optical read/write device is accomplished.

4. The method according to claim 1, wherein said method for preventing an optical disk from being scraped moves an object lens device of said optical read/write device within the range between said upper boundary and said bottom boundary in said vertical direction, and stops the motion of said object lens device immediately when said object lens device is moving upward out of said upper boundary or moving downward out of said bottom boundary.

5. The method according to claim 4, wherein said moving of said object lens device to said focal position comprises moving said object lens device toward said optical disk in said vertical direction from an initial position to let the laser light emitted from said optical read/write device exactly focus on said read/write surface.

6. The method according to claim 5, wherein said initial position is a position where said optical read/write device is when said optical disk has been placed into said optical read/write device and said optical read/write device is initiated for use.

7. The method according to claim 5, wherein said moving of said object read/write lens device toward said optical disk comprises moving said object lens device step by step a little distance toward said optical disk.

8. The method according to claim 1, wherein the vertical distance between said upper boundary and said read/write surface is $P_1$ and the vertical distance between said bottom boundary and said read/write surface is $P_2$, wherein both said $P_1$ and said $P_2$ are respectively at least larger than 0.

9. The method according to claim 8, wherein both said $P_1$ and said $P_2$ must be respectively at least larger than a half of the vertical width $W_0$ of the body of said optical read/write device.

10. The method according to claim 9, wherein said $P_1$ must be larger than the sum of the deformation of said optical disk and a half of said vertical width $W_0$.

11. The method according to claim 9, wherein said $P_1$ must be larger than the sum of the vertical wobble variation of said optical disk and a half of said vertical width $W_0$.

12. The method according to claim 1, wherein said method for preventing said optical disk from being scraped begins with placement of said optical disk into said optical read/write device, and said method for preventing said optical disk from being scraped only needs to be executed one time for said optical disk.

13. The method according to claim 1, wherein said method for preventing said optical disk from being scraped is proceeded along with a self-adjusting process of said optical read/write device.

14. The method according to claim 2, wherein said method for preventing said optical disk from being scraped is started when said optical disk has been placed into said optical read/write device.

* * * * *